United States Patent
Huang et al.

(10) Patent No.: US 12,022,266 B2
(45) Date of Patent: Jun. 25, 2024

(54) MICROPHONE ARRAY

(71) Applicant: NUVOTON TECHNOLOGY CORPORATION, Hsinchu (TW)

(72) Inventors: Chun-Hao Huang, Hsinchu Science Park (TW); Tze-Lan Shen, Hsinchu Science Park (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 180 days.

(21) Appl. No.: 17/815,920

(22) Filed: Jul. 28, 2022

(65) Prior Publication Data

US 2023/0232152 A1    Jul. 20, 2023

(30) Foreign Application Priority Data

Jan. 18, 2022 (TW) .................... 111101985

(51) Int. Cl.
*H04R 3/00* (2006.01)
*G06F 13/42* (2006.01)
*G10L 15/22* (2006.01)

(52) U.S. Cl.
CPC ......... *H04R 3/005* (2013.01); *G06F 13/4291* (2013.01); *G10L 15/22* (2013.01); *H04R 2430/20* (2013.01)

(58) Field of Classification Search
CPC .. G06F 13/4291; G10L 15/22; H04R 2430/20
See application file for complete search history.

(56) References Cited

U.S. PATENT DOCUMENTS

| | | | | |
|---|---|---|---|---|
| 5,608,803 A | * | 3/1997 | Magotra | H04R 25/552 |
| | | | | 381/314 |
| 2003/0235000 A1 | * | 12/2003 | Takayama | G11B 27/11 |

FOREIGN PATENT DOCUMENTS

| | | | | |
|---|---|---|---|---|
| CA | 2614252 A1 | * | 1/2007 | ............. H04B 1/082 |
| CN | 106104686 A | * | 11/2016 | ............. G10L 15/00 |
| CN | 106303828 A | * | 1/2017 | ............. H04R 3/005 |
| CN | 109039335 B | * | 9/2021 | .......... H03M 1/1255 |

* cited by examiner

*Primary Examiner* — Oyesola C Ojo
(74) *Attorney, Agent, or Firm* — Snyder, Clark, Lesch & Chung, LLP

(57) ABSTRACT

A microphone array includes a four-channel serial peripheral interface, a core logic unit, a data receiving unit and a voice recognition unit. The four-channel serial peripheral interface includes a bit clock signal line, a frame clock signal line, and four data signal lines, the core logic unit includes a frequency divider module for converting the control signal and the clock signal to provide a bit clock signal and a frame clock signal. The data receiving unit includes a shift register and a buffer, the shift register is connected to four data signal lines and receives input data of the four digital microphones, and the buffer is connected to the shift register. The voice recognition unit is connected to the data receiving unit and receives microphone signals of the four digital microphones to perform voice recognition.

8 Claims, 4 Drawing Sheets

MICROPHONE ARRAY

CROSS-REFERENCE TO RELATED APPLICATION

This application claims the benefit of Taiwan Patent Application No. 111101985, filed on Jan. 18, 2022, in the Taiwan Intellectual Property Office, the disclosure of which is incorporated herein in its entirety by reference.

BACKGROUND OF THE INVENTION

1. Field of the Invention

The present invention is related to a microphone array, and more particularly to a microphone array which has four digital microphones and a four-channel serial peripheral interface and is capable of accurately recognizing voice data from each of the four digital microphones.

2. Description of the Related Art

When a voice device is applied to perform the voice recognition, a digital microphone is required to sense voice data, and the received voice data is analyzed to recognize a content of the target voice. In general, the voice device can include multiple digital microphones arranged in an array to face different directions to receive voice in omnidirectional. The received times, intensities and source directions of the sound signals received from different directions are compared to each other, so as to suppress the voice from directions other than the target direction and accurately focus on the voice from the target direction. For the voice recognition, obtaining accurate target voice is important for sequential analysis computing process to provide higher reliability, and the whole SNR can be improved by reducing noise.

In a conventional microphone array, each digital microphone needs a dedicated data transmission signal line and also needs a signal line for transmitting a clock signal in order to synchronize the receiving times of multiple digital microphones. Furthermore, with configuration of multiple digital microphones, the electronic device or the sensing chip requires multiple contacts or pins to connect the above-mentioned signal lines, and the requirement increases the space for circuit design and the manufacturing cost. In addition, separately controlling and receiving signal from a single one of the digital microphones may occur error in data transmission and signal analysis of the voice recognition unit, for example, it is difficult to transmit and receive voice data of multiple digital microphones at the same time, that adversely affect the reliability in subsequent recognition.

Therefore, what is needed is to develop a microphone array to solve the conventional problem.

SUMMARY OF THE INVENTION

An objective of the present invention is to provide a microphone array which has a lower requirement in peripheral interface contacts and circuits, so as to solve the conventional problem in signal synchronization.

In order to achieve the objective, the present invention provides a microphone array including a four-channel serial peripheral interface, a core logic unit, a data receiving unit, and a voice recognition unit. The four-channel serial peripheral interface includes a bit clock signal line, a frame clock signal line and four data signal lines, wherein the four data signal lines are connected to four digital microphones, respectively, and each of the four digital microphones is connected to the bit clock signal line and the frame clock signal line. The core logic unit is connected to a control module and a clock signal module and configured to receive a control signal of the control module and a clock signal of the clock signal module, wherein the core logic unit includes a frequency divider module connected to the bit clock signal line and the frame clock signal line and configured to convert the control signal and the clock signal to provide a bit clock signal of the bit clock signal line and a frame clock signal of the frame clock signal line. The data receiving unit includes a shift register and a buffer, wherein the shift register is connected to four data signal lines and configured to receive input data of each of the four digital microphones, and the buffer is connected to the shift register. The voice recognition unit is connected to the data receiving unit and configured to receive microphone signals of the four digital microphones to perform voice recognition.

According to an embodiment, the microphone array includes a data reconstruction module disposed in the data receiving unit.

According to an embodiment, the data reconstruction module is disposed between the shift register and the buffer, and configured to divide serial input data of the shift register into serial signals corresponding to the four digital microphones and temporarily store the serial signals in the buffer.

According to an embodiment, the buffer includes four FIFO buffer areas to store the serial signals, respectively, wherein the serial signals are outputted to the voice recognition unit to serve as the microphone signals in a sequential order.

According to an embodiment, the microphone array of the present invention includes a data reconstruction module disposed between the data receiving unit and the voice recognition unit.

According to an embodiment, serial input data of the shift register is temporarily stored in the buffer, the buffer includes four FIFO buffer areas, the serial input data are stored in the four FIFO buffer areas and transmitted to the data reconstruction module in a sequential order.

According to an embodiment, the data reconstruction module divides the serial input data into serial signals corresponding to the four digital microphones, and outputs the serial signals to the voice recognition unit as the microphone signals.

According to an embodiment, the four-channel serial peripheral interface comprises a status control register and a peripheral bus interface controller, the status control register is connected to the core logic unit, the peripheral bus interface controller is connected to the status control register, the data receiving unit, and the voice recognition unit.

According to above-mentioned contents, the microphone array of the present invention has at least one of the following effects.

First, the present invention connects the four digital microphones to form the microphone array through the single four-channel serial peripheral interface, so that the contacts and circuits required for individually controlling each microphone can be reduced and the input interface can be simplified, thereby improving the device structure and reducing the manufacturing cost.

Secondly, the frequency divider module of the microphone array of the present invention provides the bit clock signal and the frame clock signal required for the digital microphones of the microphone array, so that the digital microphones can achieve signal synchronization during voice message transmission.

Thirdly, the microphone array of the present invention reconstructs the interleaved serial data as the microphone signals corresponding to the digital microphones, and the voice recognition unit can independently process the received data of each digital microphone, so that the microphone array of the present invention can have high transmission speed and focus on analysis of the high precision voice data of the digital microphones in different directions, thereby improving reliability of the microphone array.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
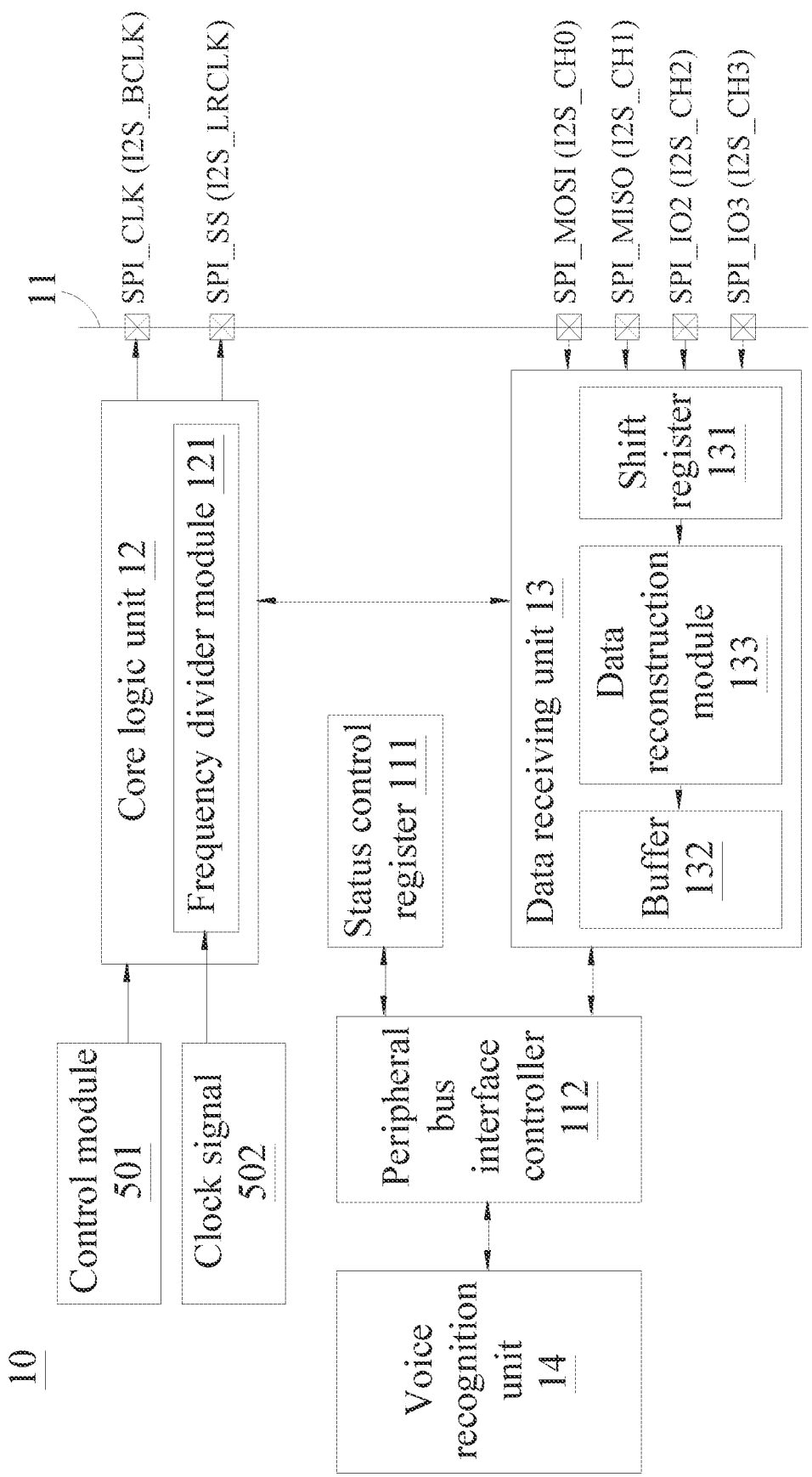
FIG. 1 is a schematic view of an embodiment of a microphone array, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Please refer to FIG. 1, which is a schematic view of an embodiment of a microphone array, according to the present invention. As shown in FIG. 1, a microphone array 10 includes a four-channel serial peripheral interface 11, a core logic unit 12, a data receiving unit 13 and a voice recognition unit 14. The four-channel serial peripheral interface includes a bit clock signal line SPI_CLK, a frame clock signal line SPI_SS, and four data signal lines; the four data signal lines include a MOSI data line SPI_MOSI, a MISO data line SPI_MISO, a second input/output (IO) signal line SPI_IO2, and a third IO signal line SPI_IO3. In the four-channel serial peripheral interface 11, the bit clock signal line SPI_CLK and the frame clock signal line SPI_SS are connected to the core logic unit 12, and the four data signal lines are connected to the data receiving unit 13.

The core logic units 12 is connected to the control module 501 and the clock signal module 502, and configured to receive a control signal of the control module 501 to drive the core logic unit 12, and receive a clock signal of the clock signal module 502. The core logic unit 12 further includes a frequency divider module 121 disposed therein; after the frequency divider module 121 receives the control signal and the clock signal, the frequency divider module 121 performs frequency dividing operation to convert the clock signal into a bit clock signal I2S_BCLK and a frame clock signal I2S_LRCLK required by the digital microphone, and outputs the bit clock signal I2S_BCLK and the frame clock signal I2S_LRCLK to the digital microphones through the bit clock signal line SPI_CLK and the frame clock signal line SPI_SS, so that the four digital microphones can perform timing synchronization with each other during signal sensing and transmission.

The four-channel serial peripheral interface 11 has the four data signal lines connected to the four digital microphones; for example, a first microphone I2S_CH0 is connected to the MOSI data line SPI_MOSI, a second microphone I2S_CH1 is connected to the MISO data line SPI_MISO, a third microphone I2S_CH2 is connected to the second IO signal line SPI_IO2, and a fourth microphone I2S_CH3 is connected to the third IO signal line SPI_IO3. The four digital microphones form a microphone array to receive the bit clock signal I2S_BCLK of the bit clock signal line SPI_CLK and the frame clock signal I2S_LRCLK of the frame clock signal line SPI_SS, and the sensing data of the four digital microphones are inputted through the four data signal lines.

The data receiving unit 13 includes a shift register 131 and a buffer 132, the buffer 132 is connected to the shift register 131, and the shift register 131 is connected to four data signal lines. After the data receiving unit 13 receives the input data of the four digital microphones, the data receiving unit 13 arranges the sensing data of the four data signal lines in an interleaved format to form serial input data, and stores the serial input data in the shift register 131. In this embodiment, the data receiving unit 13 further includes a data reconstruction module 133 disposed between the shift register 131 and the buffer 132, the data reconstruction module 133 divides the serial input data stored in the shift register 131 into the serial signals corresponding to the digital microphones, and temporarily stores the serial signals in the buffer 132. The buffer 132 includes four FIFO buffer areas, and the serial signals of the four digital microphones are stored in the four FIFO buffer areas, and outputted to the voice recognition unit 14 in a sequential order, for sequential voice recognition operation on the signals of the digital microphones. The data reconstruction module 133 re-arranges the interleaved serial input data to store the input data belonged to the same digital microphone in the same buffer area, so that the voice recognition unit 14 can directly perform data analysis one the data belonged to the same digital microphone.

The four-channel serial peripheral interface 11 includes a status control register 111 and a peripheral bus interface controller 112, the status control register 111 is connected to the core logic unit 12, and the peripheral bus interface controller 112 is connected to the status control register 111, the data receiving unit 13 and the voice recognition unit 14. The buffer 132 of the data receiving unit 13 transmits the serial signal of each digital microphone to the voice recognition unit 14 through the peripheral bus interface controller 112, and the voice recognition unit performs the voice recognition on the microphone signal belonged to each digital microphone. By recognizing the sound signals sensed by different microphones to check signal strength of the digital microphones in different directions during signal transmission, the sound on the direction other than the target direction can be suppressed to improve recognition degree of the voice in the target direction, to improve reliability and signal-noise ratio (SNL) of the voice recognition.

Figure 2:
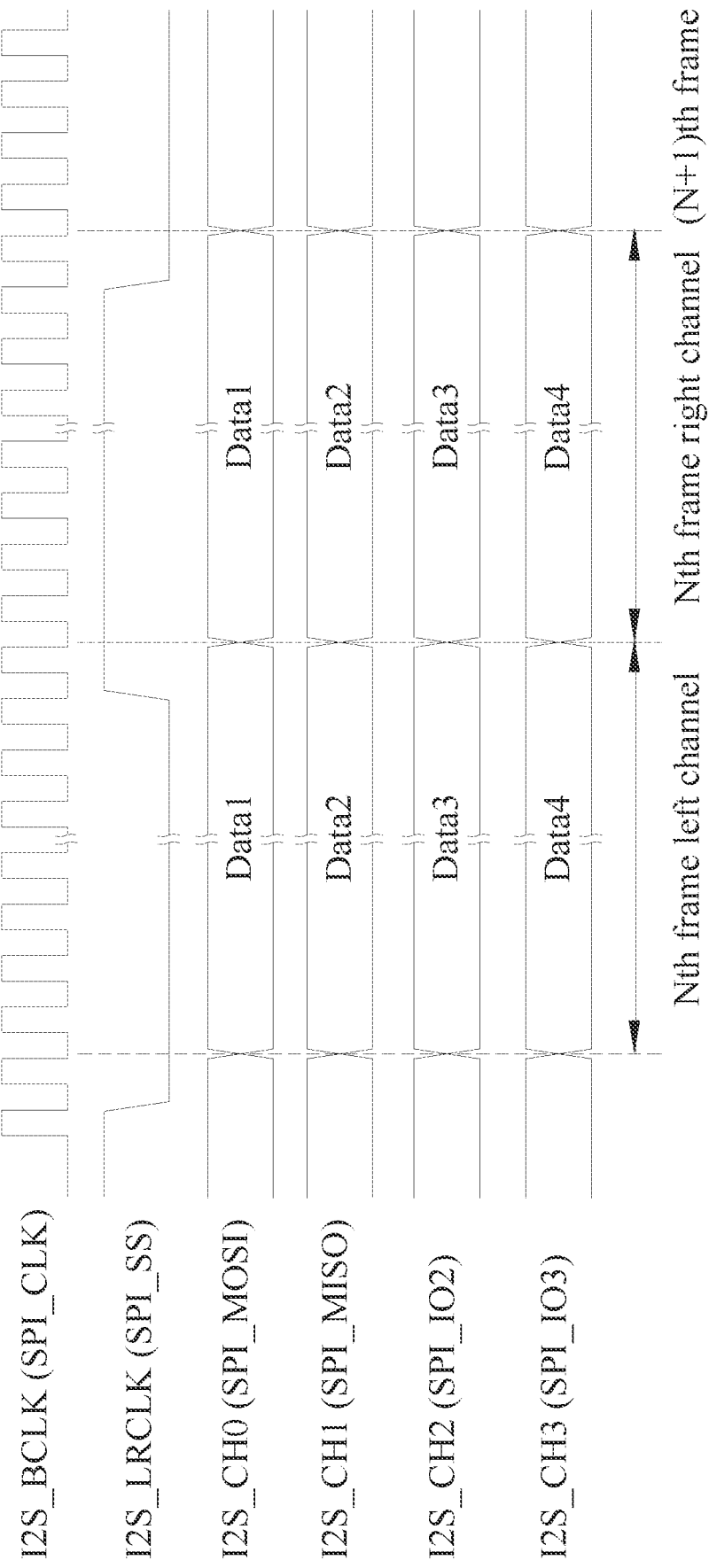
FIG. 2 is a schematic view of waveforms of timing signals and input data, according to an embodiment of the present invention.

Please refer to FIG. 2, which is a schematic view of waveforms of timing signals and input data, according to an embodiment of the present invention. Please also refer to FIG. 1. The frequency divider module 121 divides the frequency of the clock signal of the clock signal module 502 to obtain the bit clock signal I2S_BCLK and the frame clock signal I2S_LRCLK required for the inter IC sound (I2S) interface; for example, the clock signal of the clock signal module 502 has an original frequency of 120 MHz, the bit clock signal I2S_BCLK can divide the clock signal of 120 MHz by 8 to obtain the clock signal with the frequency of 1.5 MHz, the signal of 120 MHz is divided by 250 to obtain the frame clock signal I2S_LRCLK having a frequency of 48 kHz, so as to obtain the clock signal required for the sound of 48 kHz, and output the bit clock signal I2S_BCLK and the frame clock signal I2S_LRCLK to the four digital microphones; as a result, the four digital microphones can achieve the signal synchronization. Compared with the conventional digital microphone array needing multiple bit clock signal lines and frame clock signal lines, the microphone array of the present invention is indeed able to reduce the amount of the required connection contacts and clock signal line, so as to effectively decrease the chip manufacturing cost.

By sharing the bit clock signal I2S_BCLK and the frame clock signal I2S_LRCLK, the four digital microphones can receive sound data synchronously, for example, the first microphone I2S_CH0 transmits the first microphone data Data1, the second microphone I2S_CH1 transmits the second microphone data Data2, the third microphone I2S_CH2 transmits the third microphone data Data3, and the fourth microphone I2S_CH3 transmits the fourth microphone data Data4. Each digital microphone transmits the Nth-frame left channel data and the Nth-frame right channel data and then transmits the (N+1)th-frame left channel and right channel data, to the data receiving unit 13.

Figure 3:
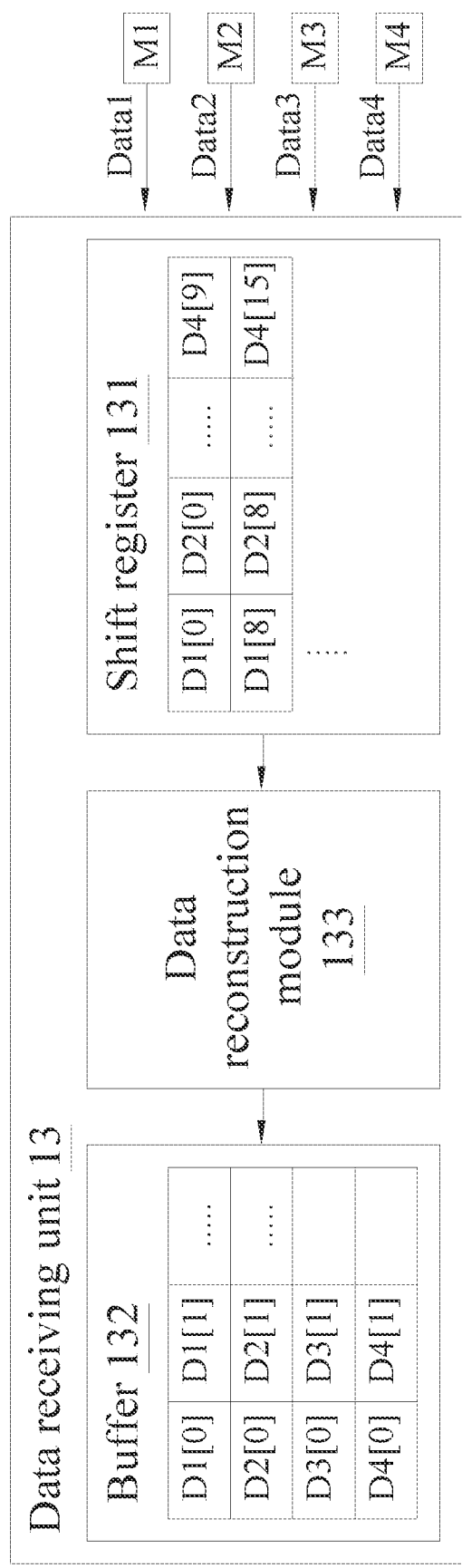
FIG. 3 is a schematic view of an embodiment of a data reconstruction module, according to the present invention.

Please refer to FIG. 3, which is a schematic view of an embodiment of a data reconstruction module, according to the present invention. Please also refer to FIG. 1. The data receiving unit 13 includes a shift register 131 and a buffer 132, and the data reconstruction module 133 is disposed between the shift register 131 and the buffer 132. The data receiving unit 13 receives the data of the four digital microphones, such as the first microphone data Data1 of the first microphone M1, the second microphone data Data2 of the second microphone M2, the third microphone data Data3 of the third microphone M3, the fourth microphone data Data4 of the fourth microphone M4, through the four data signal lines. After the data is inputted into the data receiving unit 13, the inputted data is interleaved in arrangement in a data row of the shift register 131 in a sequential order. For example, when 32 pieces of data can be stored in the data row, the 32 pieces of data including the first-frame data D1[0] of the first microphone M1, the first-frame data D2[0] of the second microphone M2 to the first-frame data D4[0] of the fourth microphone M4, the second-frame data D1[1] of the first microphone M1 to the second-frame data D4[1] of the fourth microphone M4, to the eighth-frame data D1[7] of the first microphone M1 to the eighth-frame data D4[7] of the fourth microphone M4 are stored in the first data row, and different frames of data are processed by the same way in a sequential order. When the data stored in the data row is directly outputted through the buffer area of the buffer 132, and the data of different digital microphones are stored in interleaved arrangement, so the voice recognition unit 14 is unable to directly differentiate the data of different digital microphones and fails to directly perform voice recognition, and it causes the problem of low analysis efficiency. In order to solve the problem, the data receiving unit 13 includes the data reconstruction module 133.

In this embodiment, after the data reconstruction module 133 divides the serial data of the data row, reconstructs the serial signal corresponding to each digital microphone, and stores the serial signals in the buffer areas of the buffer 132. For example, in a condition that the buffer 132 has four FIFO buffer areas, the data reconstruction module 133 divides the serial data, and stores the N pieces of frame data D1[0], D1[1], . . . , D1[N] of the first microphone M1 in the first buffer area, and stores the N pieces of frame data D2[0], D2[1], . . . , D2[N] of the second microphone M2 in the second buffer, and so on. When the microphone data stored in the buffer 132 is outputted to the voice recognition unit 14, the voice data of the digital microphones can be outputted in a sequential order, so that the original buffer 132 can be operated in a high transmission speed, the voice recognition unit 14 can differentiate the voice data corresponding to different digital microphones and accurately analyze the voice receiving statuses of the digital microphones for voice recognition, thereby achieving high precision recognition effect for the digital microphone in different directions.

Figure 4:
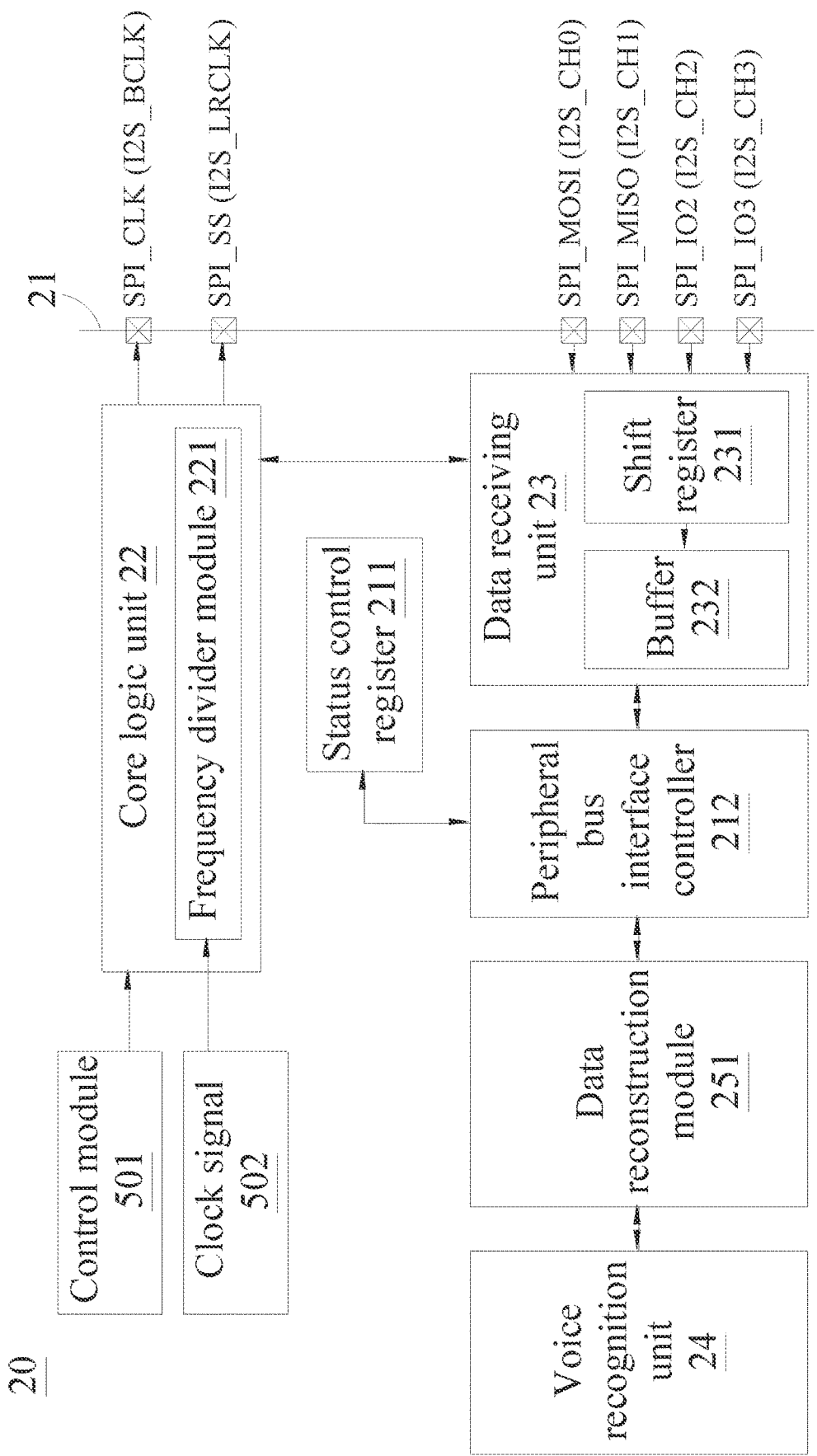
FIG. 4 is a schematic view of another embodiment of a microphone array, according to the present invention.

Please refer to FIG. 4, which is a schematic view of another embodiment of a microphone array, according to the present invention. As shown in FIG. 4, a microphone array 20 includes a four-channel serial peripheral interface 11, a core logic unit 22, a data receiving unit 23 and a voice recognition unit 24. The four-channel serial peripheral interface includes a bit clock signal line SPI_CLK, a frame clock signal line SPI_SS, and four data signal lines; the four data signal lines includes a MOSI data line SPI_MOSI, a MISO data line SPI_MISO, a second IO signal line SPI_IO2, and a third IO signal line SPI_IO3. In the four-channel serial peripheral interface 21, the bit clock signal line SPI_CLK and the frame clock signal line SPI_SS are connected to the core logic unit 22, and the four data signal lines are connected to four data receiving unit 23.

The core logic unit 22 is connected to the control module 501 and the clock signal module 502 and configured to receive a control signal of the control module 501 to drive the core logic unit 22 and also receive a clock signal of the clock signal module 502. The core logic unit 22 includes a frequency divider module 221 disposed therein. After receiving the control signal and the clock signal, the frequency divider module 221 performs frequency dividing operation to convert the clock signal into the bit clock signal I2S_BCLK and the frame clock signal I2S_LRCLK required by four digital microphones, and outputs the bit clock signal I2S_BCLK and the frame clock signal I2S_LRCLK to the four digital microphones through the bit clock signal line SPI_CLK and the frame clock signal line SPI_SS, so that the four digital microphones can perform timing synchronization during signal sensing and transmission.

The four-channel serial peripheral interface 21 has the four data signal lines connected to the four digital microphones to receive sensing data of the four digital microphones, respectively; the four data signal lines include a MOSI data line SPI_MOSI, a MISO data line SPI_MISO, a second IO signal line SPI_IO2, and a third IO signal line SPI_IO3.

The data receiving unit 23 includes a shift register 231 and a buffer 232, the buffer 232 is connected to the shift register 231, the shift register 231 is connected to four data signal lines. After the data receiving unit 13 receives the input data of the four digital microphones, the data receiving unit 13 arranges the sensing data on the four data signal lines in an interleaved format to form the serial input data, and stores the serial input data in the shift register 231. The buffer 232 has four FIFO buffer areas, the serial input data is stored in four FIFO buffer areas and then outputted in sequential order. The four-channel serial peripheral interface 21 has a status control register 211 and a peripheral bus interface controller 212, the status control register 211 is connected to the core logic unit 22, the peripheral bus interface controller 212 is connected to the status control register 211, the data receiving unit 23, and the voice recognition unit 24.

In this embodiment, the microphone data is received from the four data signal lines, stored as the serial input data in interleaved arrangement, and then outputted through the buffer 232 in a sequential order; however, the serial input data has input signals of the four digital microphones, so it is difficult to quickly and correctly perform the voice recognition on each digital microphone, and may cause problem in recognition efficiency and accuracy rate; therefore, in this embodiment, a data reconstruction module 251 can be disposed between the data receiving unit 23 and the voice recognition unit 24, for example, the serial input data stored in the buffer 232 of the data receiving unit 23 is transmitted to the data reconstruction module 251 through the peripheral bus interface controller 212, and the data reconstruction module 251 divides the serial input data into the serial signals corresponding to the four digital microphones, and outputs the serial signals to the voice recognition unit 24 as the microphone signals corresponding to the four digital microphones.

FIG. 3 shows an operation of the data reconstruction module 251 to divide the serial input data into the individual serial signal for the individual four digital microphones, the voice recognition unit 24 extracts the data of the four digital microphones at the same time based on the setting of the digital microphone directions, filters the sound on the target direction and performs the voice recognition on the filtered sound. With configuration of the microphone array 20 of the present invention, the single four-channel serial peripheral interface 21 can receive the data of the four digital microphones at the same time and reconstruct the received data, the received voice data can be analyzed independently for different digital microphone, so that the voice recognition can be efficiently and more accurately performed to analyze the target voice. Therefore, an accurate control command or operation instruction can be provided based on the accurate voice recognition result, so that the voice control or operation can be correctly executed.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A microphone array, comprising:
   a four-channel serial peripheral interface, comprising a bit clock signal line, a frame clock signal line and four data signal lines, wherein the four data signal lines are connected to four digital microphones, respectively, and each of the four digital microphones is connected to the bit clock signal line and the frame clock signal line;
   a core logic unit, connected to a control module and a clock signal module and configured to receive a control signal of the control module and a clock signal of the clock signal module, wherein the core logic unit comprises a frequency divider module connected to the bit clock signal line and the frame clock signal line and configured to convert the control signal and the clock signal to provide a bit clock signal of the bit clock signal line and a frame clock signal of the frame clock signal line;
   a data receiving unit, comprising a shift register and a buffer, wherein the shift register is connected to four data signal lines and configured to receive input data of each of the four digital microphones, and the buffer is connected to the shift register; and
   a voice recognition unit, connected to the data receiving unit and configured to receive microphone signals of the four digital microphones to perform voice recognition.

2. The microphone array according to claim 1, further comprising a data reconstruction module disposed in the data receiving unit.

3. The microphone array according to claim 2, wherein the data reconstruction module is disposed between the shift register and the buffer, and configured to divide serial input data of the shift register into serial signals corresponding to the four digital microphones and temporarily store the serial signals in the buffer.

4. The microphone array according to claim 3, wherein the buffer comprises four FIFO buffer areas to store the serial signals, respectively, wherein the serial signals are outputted to the voice recognition unit to serve as the microphone signals in a sequential order.

5. The microphone array according to claim 1, further comprising a data reconstruction module disposed between the data receiving unit and the voice recognition unit.

6. The microphone array according to claim 5, wherein serial input data of the shift register is temporarily stored in the buffer, the buffer comprises four FIFO buffer areas, the serial input data are stored in the four FIFO buffer areas and transmitted to the data reconstruction module in a sequential order.

7. The microphone array according to claim 6, wherein the data reconstruction module divides the serial input data into serial signals corresponding to the four digital microphones, and outputs the serial signals to the voice recognition unit as the microphone signals.

8. The microphone array according to claim 1, wherein the four-channel serial peripheral interface comprises a status control register and a peripheral bus interface controller, the status control register is connected to the core logic unit, the peripheral bus interface controller is connected to the status control register, the data receiving unit, and the voice recognition unit.

* * * * *